US006705207B2

(12) United States Patent
Murase et al.

(10) Patent No.: US 6,705,207 B2
(45) Date of Patent: Mar. 16, 2004

(54) PISTON TYPE COMPRESSOR

(75) Inventors: Masakazu Murase, Kariya (JP); Tatsuya Koide, Kariya (JP); Takayuki Imai, Kariya (JP)

(73) Assignee: Kabushiki Kaisha Toyota Jidoshokki, Kariya (JP)

( * ) Notice: Subject to any disclaimer, the term of this patent is extended or adjusted under 35 U.S.C. 154(b) by 76 days.

(21) Appl. No.: 10/086,479

(22) Filed: Feb. 28, 2002

(65) Prior Publication Data

US 2002/0121189 A1 Sep. 5, 2002

(30) Foreign Application Priority Data

Mar. 2, 2001 (JP) ....................................... 2001-058214

(51) Int. Cl.[7] ................................................ F16J 1/04
(52) U.S. Cl. ............................................ 92/223; 92/71
(58) Field of Search ..................................... 92/223, 71

(56) References Cited

U.S. PATENT DOCUMENTS

| | | | | | |
|---|---|---|---|---|---|
| 2,575,214 | A | | 11/1951 | Garland et al. | 309/14 |
| 3,914,574 | A | | 10/1975 | Hill et al. | 219/121 EM |
| 4,264,652 | A | | 4/1981 | Danese et al. | 427/282 |
| 5,241,748 | A | | 9/1993 | Ishida | 29/888.074 |
| 5,392,692 | A | | 2/1995 | Rao et al. | 92/246 |
| 5,653,021 | A | * | 8/1997 | Matsuyama et al. | 92/223 |
| 5,713,324 | A | * | 2/1998 | Frame et al. | 92/223 |
| 5,941,161 | A | * | 8/1999 | Kimura et al. | 92/71 |
| 6,073,538 | A | * | 6/2000 | Tomesani | 92/155 |
| 6,098,518 | A | * | 8/2000 | Kuhn et al. | 92/71 |
| 6,422,129 | B1 | * | 7/2002 | Yokomachi et al. | 92/71 |

FOREIGN PATENT DOCUMENTS

| | | | |
|---|---|---|---|
| DE | 198 33 827 C1 | 12/1999 | F02F/3/10 |
| EP | 0 838 590 A1 | 4/1998 | F04B/27/08 |
| EP | 0952 340 A2 | 10/1999 | F04B/27/08 |
| JP | 53-52264 | 5/1978 | B23K/1/00 |
| JP | 59-076868 | 5/1984 | C23C/7/00 |
| JP | 3-41102 | 8/1991 | F04B/37/14 |
| JP | 08-109882 | 4/1996 | F04B/39/00 |

OTHER PUBLICATIONS

Lubrication. Encyclopedia Britannica from Encyclopedia Britannica Online <http://www.search.eb.com/eb/article?eu=50407>.*

* cited by examiner

*Primary Examiner*—Edward K. Look
*Assistant Examiner*—Michael Leslie
(74) *Attorney, Agent, or Firm*—Morgan & Finnegan, LLP

(57) ABSTRACT

A piston type compressor has a housing, a cylinder block and a piston. The cylinder block is fixed to the housing. The piston is accommodated in the cylinder block. A piston ring is provided between the cylinder block and the piston. A sealing coat is made of soft metal, and is provided between the piston ring and the piston.

13 Claims, 4 Drawing Sheets

PISTON TYPE COMPRESSOR

BACKGROUND OF THE INVENTION

The present invention relates to a compressor. More particularly, the present invention relates to a piston type compressor that provides a piston ring fitted onto a piston.

A piston type compressor such as a swash plate type compressor generally includes a cylinder block and suction and discharge chambers so as to sandwich a valve plate assembly, and the cylinder block accommodates a piston. By reciprocation of the pistons, fluid in the suction chamber is sucked into the cylinder block, and the fluid sucked in the cylinder block is compressed and discharged to the discharge chamber. Also, to suck the fluid into the cylinder block and compress and discharge the fluid to the discharge chamber efficiently, sealing performance between the pistons and the cylinder block is important. Japanese Unexamined Patent Publication No. 11-294322 discloses a compressor that provides a coating made of fluoro resin on the outer circumferential surface of the pistons and a piston ring fitted onto the pistons. Thereby, sealing performance between the pistons and the cylinder block is ensured.

To achieve higher compression efficiency, sealing performance between the pistons and the piston rings in addition to sealing performance of the pistons and the cylinder block is also required to improve. Alternative refrigerant gas such as carbon dioxide is promoted to be a practical use to deal with environmental problems these days. However, carbon dioxide for using in a compressor as a compressing target requires quite a high compression ratio. Therefore, the above-mentioned requirements for sealing performance have been further increasing these days.

SUMMARY OF THE INVENTION

The present invention addresses the above-mentioned problems traceable to a relatively high compression ratio by improving sealing performance between pistons and piston rings.

According to the present invention, a piston type compressor has a housing, a cylinder block and a piston. The cylinder block is fixed to the housing. The piston is accommodated in the cylinder block. A piston ring is provided between the cylinder block and the piston. A sealing coat is made of soft metal, and is provided between the piston ring and the piston.

In the piston type compressor mentioned above, sealing performance between the piston ring and the piston is improved by the sealing coat made of soft metal.

The present invention also provides a method of forming a sealing coat on a surface of a groove on a piston. The method includes forming a coat made of fluoro resin on the outer circumferential surface of the piston, recessing a groove for accommodating a piston ring on the outer circumferential surface of the piston by machining, and immersing the piston in soft metal.

Other aspects and advantages of the invention will become apparent from the following description, taken in conjunction with the accompanying drawings, illustrating by way of example the principles of the invention.

BRIEF DESCRIPTION OF THE DRAWINGS

The features of the present invention that are believed to be novel are set forth with particularity in the appended claims. The invention together with objects and advantages thereof, may best be understood by reference to the following description of the presently preferred embodiments together with the accompanying drawings in which:

DETAILED DESCRIPTION OF THE PREFERRED EMBODIMENTS

An embodiment of the present invention, which is applied to a swash plate type variable displacement piston type compressor for compressing refrigerant gas, will now be described with reference to FIGS. 1 through 4. The left side and the right side in FIG. 1 correspond to the front end and the rear end, respectively.

Figure 1:
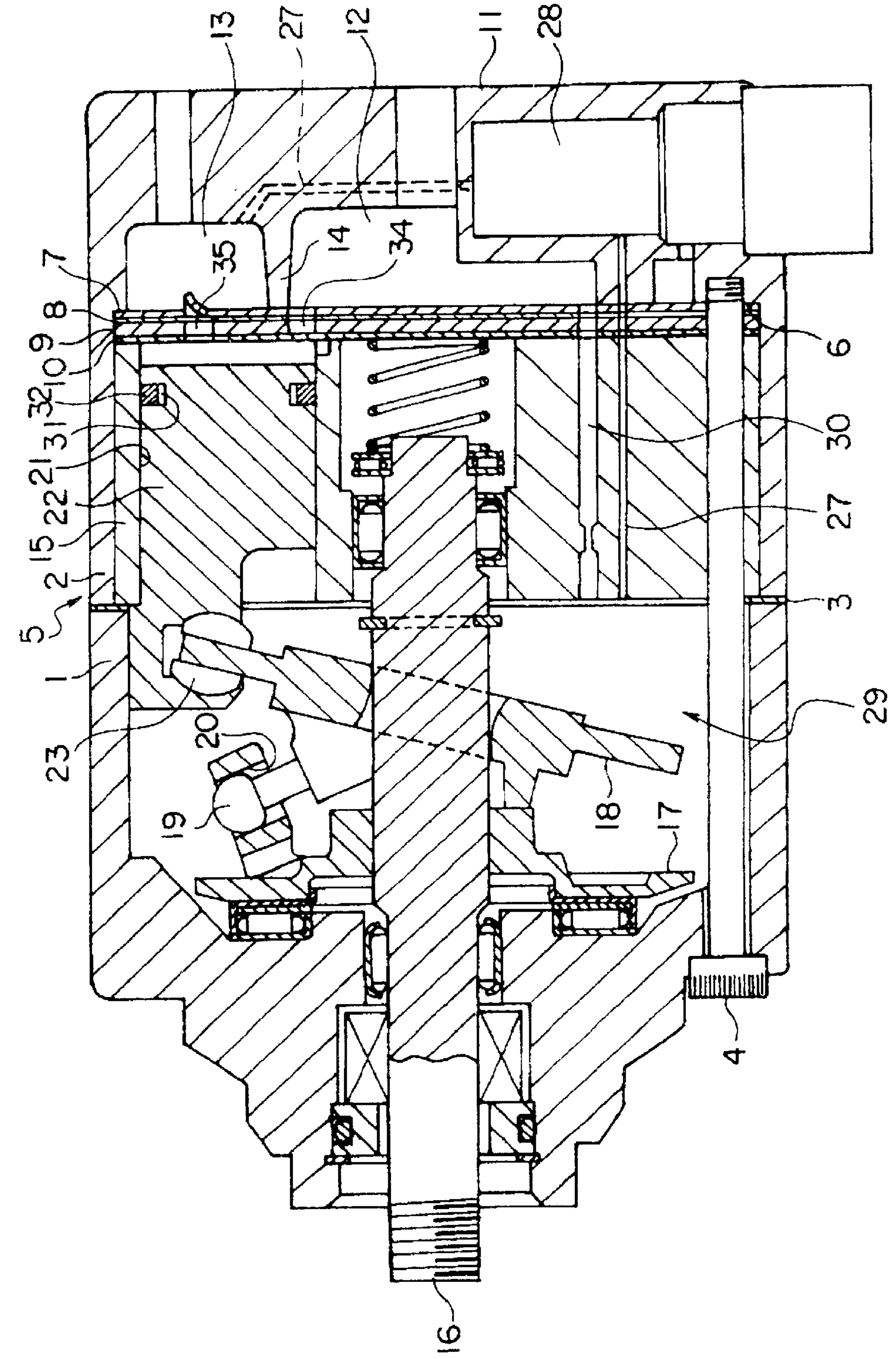
FIG. 1 is a longitudinal cross-sectional view of a piston type compressor according to an embodiment of the present invention.

As shown in FIG. 1, a bolt 4 screws a front housing 1 to a rear housing 2 via a gasket 3, thus constructing a housing 5 of a compressor. The rear housing 2 provides a step 6 inside. A retainer plate 7, a discharge valve plate 8, a valve plate 9 and a suction valve plate 10 are fitted onto the step 6. The retainer plate 7 and a rear end wall 11 of the rear housing 2 define a suction chamber 12 and a discharge chamber 13 such that a partition wall 14 separates the suction chamber 12 and the discharge chamber 13 from each other.

A cylinder block 15 is fitted onto the suction valve plate 10 in the rear housing 2. The cylinder block 15 and the front housing 1 rotatably support a drive shaft 16. The drive shaft 16 protrudes its front end outside the front housing 1, and connects with a driving source such as an engine and a motor of a vehicle, which is not shown. In the front housing 1, a lug plate 17 is secured to the drive shaft 16, and a swash plate 18 engages with the lug plate 17. The drive shaft 16 extends a through hole, which is formed through the center of the swash plate 18. A pair of guide pins 19 extending from the swash plate 18 is slidably fitted into a pair of guide holes 20 formed with the lug plate 17. The swash plate 18 integrally rotates with the drive shaft 16 so that the guide pins 19 engages with the guide holes 20, and is tiltably supported by the drive shaft 16 so as to slide along the axis of the drive shaft 16.

A plurality of cylinder bores 21 is defined in the cylinder block 15 so as to surround the drive shaft 16, the cylinder bores 21 each slidably accommodate respective pistons 22. The pistons 22 each engage with the periphery of the swash plate 18 through a pair of shoes 23. As the swash plate 18 rotates with the drive shaft 16, the pistons 22 each reciprocate relative to the axis of the drive shaft 16 in the associated cylinder bores 21 through shoes 23. Besides, the single cylinder bore 21 and the single piston 22 are shown in FIG. 1. However, the compressor provides seven cylinder bores 21 and the seven pistons 22 in this embodiment.

The discharge chamber 13 communicates with a crank chamber 29, or a control chamber 29, which is defined in the front housing 1 via a supply passage 27 and a control valve 28, and the crank chamber 29 communicates with the suction chamber 12 via a bleed passage 30. As the control valve 28 opens, refrigerant gas in the discharge chamber 13 flows into the crank chamber 29 via the supply passage 27 and the control valve 28, thus increasing pressure in the crank chamber 29. The inclination of the swash plate 18 varies in accordance with the pressure in the crank chamber 29. As the pressure in the crank chamber 29 increases, the inclination angle relative to the plane perpendicular to the axis of the drive shaft 16 decreases. As the pressure in the crank chamber 29 decreases, the inclination angle increases. Namely, the inclination of the swash plate 18 is varied by adjusting the control valve 28 due to an external control or an internal control.

Figure 2:
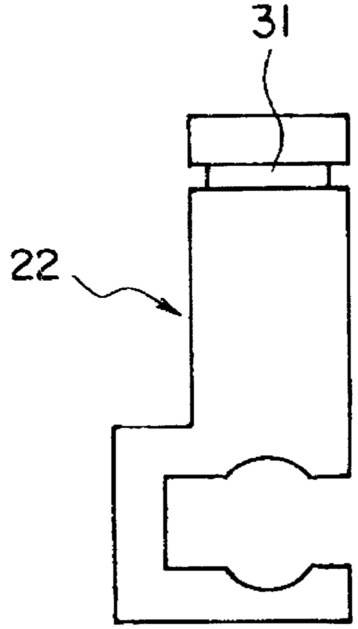
FIG. 2 is a side view of a piston in FIG. 1.
Figure 3:
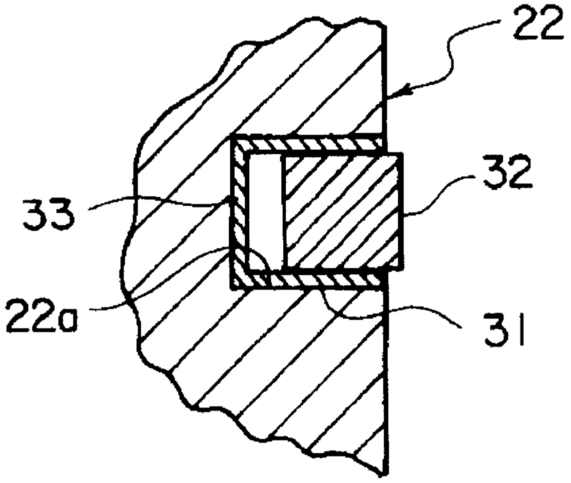
FIG. 3 is an enlarged cross-sectional partial view showing a piston ring fitted onto a piston in FIG. 1.

As shown in FIGS. 1 through 3, the outer circumferential surface of the pistons 22 adjacent to a piston head each provide annular grooves 31. A groove surface 22*a*, the cross section of which is rectangular defines the groove 31 on the piston 22. An annular piston ring 32 occupies the groove 31. The piston ring 32 is made by shaping a cast iron member, the cross section of which is rectangular, into a ring. Also, the groove surface 22*a* provides soft metal, or a sealing coat 33 made of tin in the present embodiment by nonelectrolytically coating. The thickness of the tin sealing coat 33 is from 2 $\mu$m to 3 $\mu$m. A process of forming the sealing coat 33 will now be described. In the present embodiment, a coat made of fluoro resin is formed on the outer circumferential surface of the piston 22, which is made of aluminum. After that, the groove 31 is recessed by machining. The tin sealing coat 33 coats the groove surface 22*a* by immersing the piston 22 with the groove 31 in tin. No tin coats the circumferential surface of the piston 22, which is coated with fluoro resin. Since the groove 31 is formed by machining, the tin sealing coat 33 coats the groove surface 22*a*, which is not coated with fluoro resin. For example, when not the tin sealing coat but a resin sealing coat is formed, the following processes are required: 1) recessing a groove on a piston; 2) coating with resin; and 3) treating the surface of a resin coat. However, when the tin sealing coat is formed, the above-described process 1) recessing a groove on a piston and process 2) coating with tin are required only. Thereby, manufacturing cost is reduced. Also, wettability of the tin sealing coat is higher than that of the resin sealing coat. Therefore, the tin sealing coat is available in performing such higher sealing performance relative to the resin sealing coat without treating the surface of the tin sealing coat.

The operation of the piston type compressor constructed above will now be described. Due to motion that the piston 22 moves from a top dead center toward a bottom dead center, refrigerant gas in the suction chamber 12 flows into a suction port 34 of the valve plate 9, and pushes a suction reed valve of the suction valve plate 10 aside, then flows into the cylinder bore 21. Due to motion that the piston 22 moves from the bottom dead center toward the top dead center, the refrigerant gas flows into a discharge port 35 of the valve plate 9, and pushes a discharge reed valve of the discharge valve plate 8 aside, then flows into the discharge chamber 13. Also, the tin sealing coat 33 performs high wettability with lubricant contained in the refrigerant gas. Thereby, when pressure of refrigerant gas such as carbon dioxide is high, the tin sealing coat 33 raises sealing performance between the piston ring 32 and the piston 22 during reciprocation of the piston 22, and inhibits the refrigerant gas from leaking therebetween. Therefore, compression efficiency improves, and lubrication is ensured. Also, when roughness of the groove surface 22*a* does not satisfies requirement, high sealing performance is ensured by coating the groove surface 22*a* with the tin sealing coat 33.

The present invention is not limited to the embodiment described above, but may be modified into the following examples.

The sealing coat is not limited to the tin sealing coat. For example, other soft metals, which performs high wettability with lubricant such as lead and zinc may be applied. Also, a position coated with the sealing coat, which is made of soft metal, is not limited to the groove surface 22*a*. The sealing coat may coat the piston ring 32.

Figure 4:
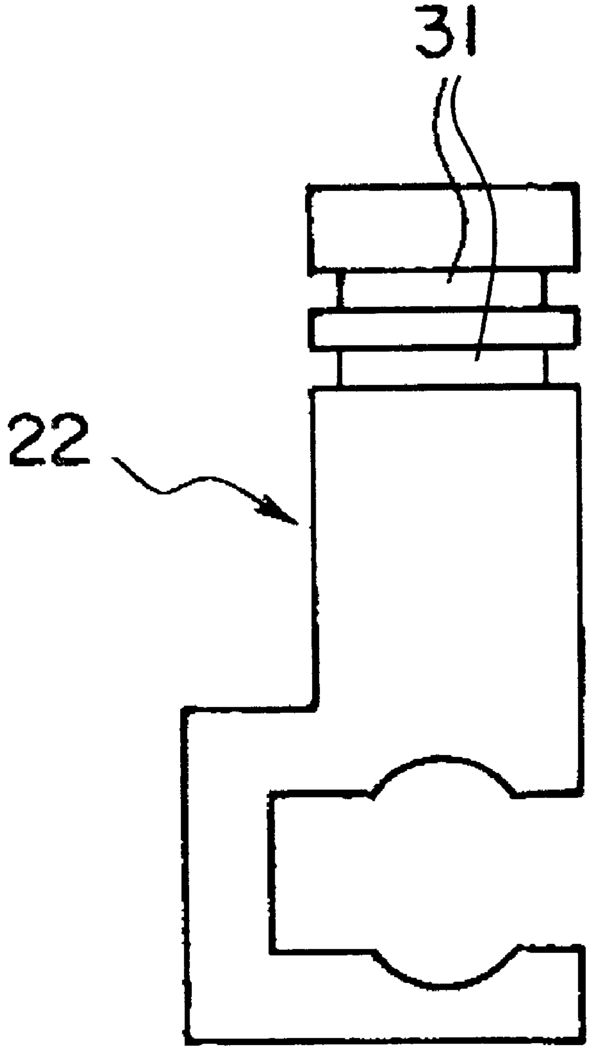
FIG. 4 is a side view of a piston with a plurality of grooves according to another embodiment of the present invention.

The groove 31 on the piston is not limited to a single groove. As shown in FIG. 4, a plurality of the grooves 31 may be recessed on the piston 22.

Figure 5:
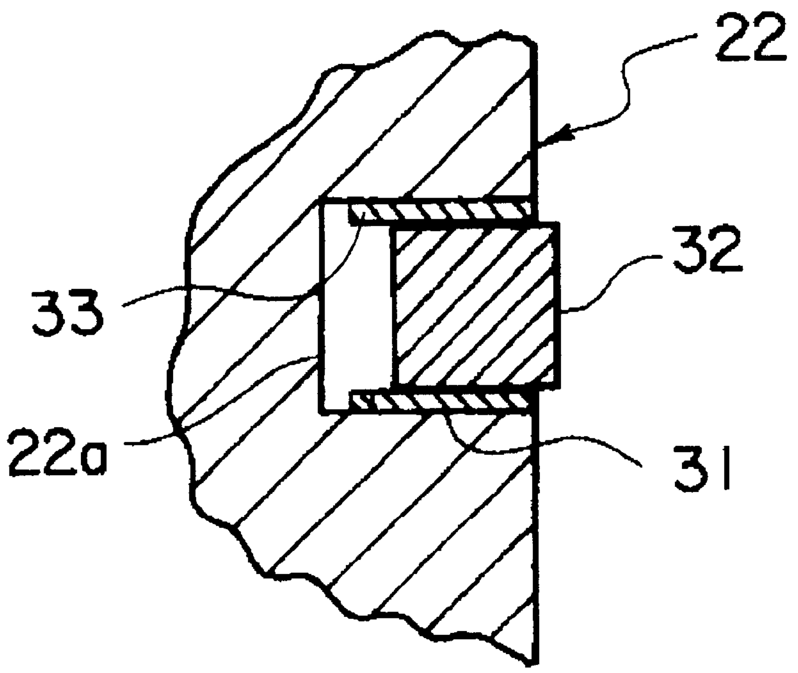
FIG. 5 is an enlarged cross-sectional partial view showing a piston ring fitted onto a piston in FIG. 1 according to another embodiment of the present invention.

The sealing coat may coat parts of the groove surface 22*a*, as shown in FIG. 5. Particularly, the sealing coat resides only on the facing end surfaces of the groove surface 22*a* other than the bottom of the groove surface 22*a*.

According to the present invention described above, the piston type compressor provides the sealing coat, which is made of soft metal, between the piston ring and the piston. Thereby, sealing performance therebetween improves, and compression efficiency improves.

Also, when a sealing coat, which is made of soft metal, is a film coating the surface of a groove on a piston, and even when roughness of the surface of the groove does not satisfies requirement, high sealing performance is ensured.

Therefore, the present examples and embodiments are to be considered as illustrative and not restrictive and the invention is not to be limited to the details given herein but may be modified within the scope of the appended claims.

What is claimed is:

1. A piston type compressor comprising:

a housing;

a cylinder block fixed to the housing;

a piston accommodated in the cylinder block;

a piston ring provided between the cylinder block and the piston; and a sealing coat made of soft metal, provided between the piston ring and the piston.

2. The piston type compressor according to claim 1, wherein the piston includes a groove on the outer circumferential surface thereof, the piston ring occupies the groove, and the sealing coat is a film coating the surface of the groove.

3. The piston type compressor according to claim 2, wherein the film coats a part of the surface of the groove.

4. The piston type compressor according to claim 2, wherein the film coats the whole surface of the groove.

5. The piston type compressor according to claim 2, wherein a plurality of the grooves is recessed on the piston, and the film coats the surface of the grooves respectively.

6. The piston type compressor according to claim 1, wherein the sealing coat is made of one of tin, lead and zinc.

7. The piston type compressor according to claim 1, wherein the thickness of the sealing coat ranges from 2 $\mu$m to 3 $\mu$m.

8. The piston type compressor according to claim 1, wherein the compressor is a variable displacement type.

9. The piston type compressor according to claim 1, wherein the compressor is a swash plate type.

10. The piston type compressor according to claim 1, wherein refrigerant gas used in the compressor is carbon dioxide.

11. A method of forming a sealing coat on a surface of a groove on a piston comprising the steps of:

forming a coat made of fluoro resin on the outer circumferential surface of the piston;

recessing a groove for accommodating a piston ring on the outer circumferential surface of the piston by machining; and immersing the piston in soft metal.

12. The method of forming a sealing coat on a surface of a groove on a piston according to claim 11, wherein the soft metal is one of tin, lead and zinc.

13. The method of forming the sealing coat on the surface of the groove on the piston according to claim 11, wherein the piston is made of aluminum.

* * * * *